(12) United States Patent
Kotzin et al.

(10) Patent No.: US 7,239,867 B2
(45) Date of Patent: Jul. 3, 2007

(54) METHOD AND APPARATUS FOR REDUCING COMMUNICATION LATENCY IN A WIRELESS GROUP CALL

(75) Inventors: Michael D. Kotzin, Buffalo Grove, IL (US); Charles P. Binzel, Bristol, WI (US); Greg R. Black, Vernon Hills, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/286,800

(22) Filed: Nov. 23, 2005

(65) Prior Publication Data

US 2006/0084442 A1    Apr. 20, 2006

Related U.S. Application Data

(63) Continuation of application No. 10/692,988, filed on Oct. 24, 2003, now Pat. No. 7,058,419.

(51) Int. Cl.
*H04M 3/42* (2006.01)

(52) U.S. Cl. .............. 455/414.1; 455/414.2; 455/41.2; 455/41.1; 455/39; 455/517; 455/518; 455/422.1

(58) Field of Classification Search ........... 455/422.1, 455/435.1, 435.2, 435.3, 403, 450, 414.1, 455/414.2, 41.2, 41.1, 39, 517, 518, 519, 455/426.1
See application file for complete search history.

(56) References Cited

U.S. PATENT DOCUMENTS

| 6,522,886 | B1 * | 2/2003 | Youngs et al. ........... 455/450 |
| 6,529,740 | B1 | 3/2003 | Ganucheau, Jr. et al. |
| 6,580,909 | B1 * | 6/2003 | Carro .................... 455/450 |
| 2002/0039895 | A1 | 4/2002 | Ross et al. |
| 2002/0172165 | A1 | 11/2002 | Rosen et al. |
| 2003/0053434 | A1 | 3/2003 | Chow et al. |
| 2003/0058827 | A1 | 3/2003 | Chow et al. |
| 2004/0162064 | A1 | 8/2004 | Himmelstein |
| 2005/0159107 | A1 * | 7/2005 | Mauney et al. ........... 455/41.2 |

* cited by examiner

*Primary Examiner*—Joseph Feild
*Assistant Examiner*—Khai Nguyen
(74) *Attorney, Agent, or Firm*—David S. Noskowicz (57) ABSTRACT

A wireless handheld communication device (102) for reducing a communication delay at a proximate wireless communication device is disclosed. The wireless handheld communication device simultaneously transmits to a remote station (106) through a base station (108), and transmits to the proximate wireless communication device (104) directly. The method includes communicating a first communication on first link (116) to a proximate wireless communication device and communicating, simultaneously with communicating the first communication, a second communication on a second link (112) to a base station, wherein the first communication and the second communication are substantially the same.

1 Claim, 9 Drawing Sheets

METHOD AND APPARATUS FOR REDUCING COMMUNICATION LATENCY IN A WIRELESS GROUP CALL

This application is a continuation of U.S. patent application Ser. No. 10/692,988 filed Oct. 24, 2003 (U.S. Pat. No. 7,058,419)

FIELD OF THE INVENTION

The present invention relates generally to wireless communication routing, and more particularly to wireless communication routing with proximate communication devices.

BACKGROUND OF THE INVENTION

Wireless communication devices and more particularly digital wireless communications systems are generally known. One type of digital communications system operates in one-way communication mode, or simplex operation. Another type of communication system operates in simultaneous two-way communication mode or in duplex operation. Current radiotelephones utilizing either of these forms of communication communicate through a central node or base station in order to communicate with other radiotelephones. This is different from devices that operate in simplex mode such as walkie-talkies that communicate directly between units without an intermediary node or base station. The walkie-talkie mode is often referred to as push-to-talk operation as the user must push and hold a button in to key up the transmitter and communicate. The walkie-talkie mode has also been incorporated into a system known as Private Land Mobile Radio Service (PLMRS) and operates in simplex mode through a base station. This type of system is also referred to as push-to-talk operation while the device is in the walkie-talkie mode.

One function of the base station type system in general is to achieve a greater distance over which communications can be achieved. Wireless communication devices that communicate directly however are generally confined to line-of-sight distances for communication. Wireless devices that operate with a base station however, do not communicate directly with other wireless communication devices in the line-of-sight operation mode.

The operation of the either duplex operating radiotelephone systems or push-to-talk form of communication over radiotelephone or cellular networks and through base stations, subjects the communications to significant audio latency. This is due in part to speech coding, the air interface transfer and synchronization delay, packet delivery latency, network latency, and the like. Although, this delay or latency is not as noticeable to the users who are not within earshot or are not within close proximity to one another, it is noticeable to those that are. When a user operates a device in a hands-free mode, and in close proximity to another device, the user of the proximate device can hear the communication directly, or in real time, from the user traveling through the air and, at the same time, through significant delay, through the base station system. Hearing the real time audio and the delayed audio from the base station makes communication difficult to understand because of the audio latency. This effect is exacerbated when there are a plurality of units in close proximity to the originating device and are all on hands-free mode. Thus, in a group call mode, audio signals from each device will reach each user at a different delay, making communication very difficult and annoying.

What is needed is a communication device that can reduce the audio latency to devices proximally located to the communication originating device.

BRIEF DESCRIPTION OF THE DRAWINGS

The various aspects, features and advantages of the present invention will become more fully apparent to those having ordinary skill in the art upon careful consideration of the following Detailed Description of the Drawings with the accompanying drawings described below.

DETAILED DESCRIPTION OF THE DRAWINGS

An electronic wireless communication device for reducing the audio latency at a proximate communication device by simultaneously transmitting information to at least two different communication devices over two different paths and a method for operation thereof is disclosed. A method of operating the wireless communication device includes establishing a first link between a proximate wireless communication device and a second link with a base station. The wireless communication device identifies, or is already aware of, or is alerted to at least one proximate communication device that is in close proximity to the wireless communication device. Next, the wireless communication device establishes a connection, which may be a logical communication connection, directly with the proximate communication device such that the wireless communication device is connected with the proximate wireless communication device, through a first path or link, and with the base station concurrently through a second path, independent from the first path. Thus communication latency of the first path to the proximate communication device, can be less than the communication latency associated with current base station communications as a result of the direct connection to the proximate communication device without being relayed through an intermediary source such as a base station.

Figure 1:
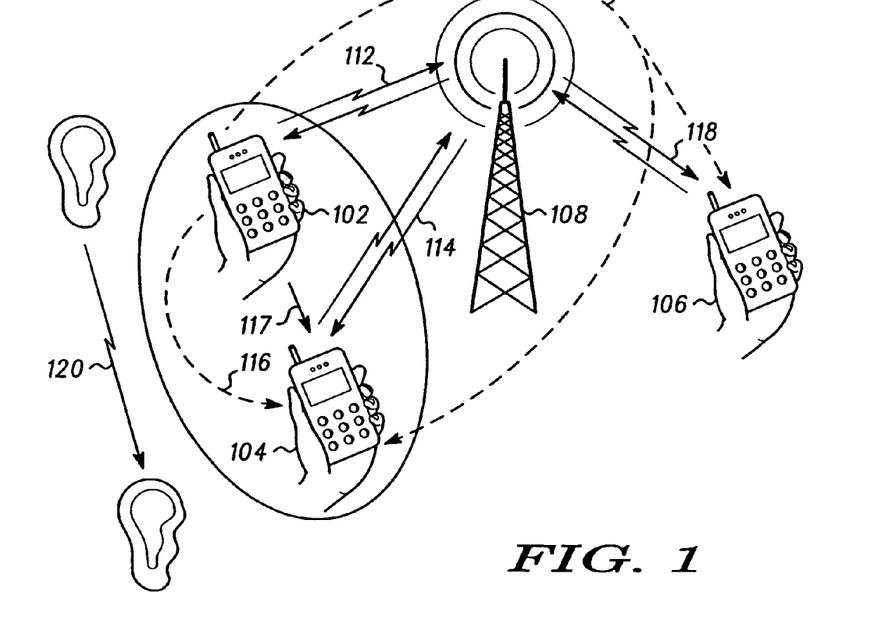
FIG. 1 is an exemplary communication system with a proximate and remote device.

In one exemplary embodiment, shown in FIG. 1, three communications devices are shown, a first device 102, a second device 104 and a third device 106. At least the first device 102 and third device 106 have the capability to operate on a network, which incorporates at least one base station 108. The second device 104 may also operate with the base station 108 but this is not necessary in this exemplary embodiment. In this exemplary embodiment, the three devices are capable of being engaged in a group call with one another. At least one device can transmit to at least two other devices simultaneously, one through the base station 108 and the other directly. This may be, for example, in simplex mode operation where only one-way communication is possible or duplex mode operation where forward and reverse communications are possible between the three devices. This is generally referred to as group call mode or conference call mode when more than two devices are communicating. The first device 102, is the call originating device in this exemplary embodiment. The second device 104 is a proximate wireless communication device located in close proximity to the first device 102. In general, close proximity or closely proximate is within ear-shot or within the range of normal hearing, but may also be defined as within range of a wireless local area network (WLAN) access point or at least closer than the distance from a base station to the first device 102. Users of the proximate devices 104 within ear-shot of the first device, which is at the source of the communication, will hear the communication through the air 120 directly.

The third device 106 is a remote device and is not in close proximity to the first device 102 or not within ear-shot of the first device 102, or not in range of normal hearing. The third device 106 must utilize the base station 108 to communicate with the first device 102. The third device 106 operates under standard radiotelephone operating conditions, wherein the wireless communication devices operate on a network and communications from one device to another device are all completed or relayed over a first communication path 110 through the base station 108. In this exemplary embodiment, the wireless communication device relays a communication to the remote device through the base station 108.

In the exemplary embodiment, shown in FIG. 1, the first device 102 communicates information with the base station 108, over the first communication link 112, which is a communication link. The base station 108 then communicates the information over the second communication link 118 to the desired remote receiving device, which is the third device 106 in this embodiment. It should be noted that the information could be relayed from the base station 108 to a plurality of devices, and not just the third device 106. One device, the third device 106, is used for exemplary purposes. When communicating through the base station 108, there is an inherent communication latency or delay between the first device 102 and the third device 106 through the base station 108. This is due in part to signal processing and the relaying of the communication from the first device 102 to the base station 108 and then to the third device 106. The propagation between the transmitting or first device 102 and the base station 108 and then the propagation between the base station 108 and the receiving station or third device 106 has an effect on the amount of communication delay as well.

In the present invention, as the first device 102 communicates with the third device 106, the first device 102 simultaneously communicates directly with the second device 104 over an alternate path, a second communication path 116, and not through the intermediary base station 108. FIG. 1 illustrates the alternate path 116 for the wireless communications, wherein the communication is a point-to-point, or direct, communication that does not pass through the base station 108. The communication from the first device 102 is routed through the base station 108 to the remote device 106 and concurrently to the second or proximate device 104 directly over the alternate path 116.

The alternate path 116 is a point-to-point or direct link 117 from the first device 102 to the second device 104, which is also referred to as simplex mode or simplex operation. In this mode, the first communication path or the standard path 110 through the base station 108 is bypassed and the second device 104 receives the communication or information directly from the first device 102, on the direct link 117 instead of through the base station 108, as it would in standard operation. This direct link 117, results in a decrease of the communication delay experienced at the second or proximate device 104. In this exemplary embodiment, an audio delay is illustrated. The delay, in general however, is a communication delay and is present whether it is audio, video, or any type of data. The decreased communication latency is the result of the elimination of the second link 118 to the base station 108 and the processing that takes place therein. The decreased communication latency is also a result of reduced propagation effects due to the direct link 117 or point-to-point connection. In order for the first device 102 and the second device 104 to communicate directly in simplex mode, the two devices must be within range to effectively transmit and receive RF communications to one another. When communicating, the first device 102 communicates simultaneously with the proximate second device 104 over the alternative path 116 and the third device 106 over the first link 112 and the second link 118 through the base station 108. The direct connection to the proximate devices is called the local area network (LAN) while the connection with the base station 108 and remote device 106 is considered to be the wide area network (WAN).

The alternate path 116 may also be from the first device 102 through a local area network access point or router to a second communication device 104. In the case of a LAN access point, the first device 102 and the second device 104 must be in range of the same access point (AP). In this exemplary embodiment, this is a wireless local area network (WLAN) access point or the like. One skilled in the art will also understand, as mentioned above, that a LAN can be a network of devices communicating with each other directly and not through an access point. The devices themselves form the LAN. The access point to a LAN, as discussed above, may be a wireless access point that complies with the 802.11 standard or WiFi or may also be a Bluetooth system or the like. This is also known as a LAN or WLAN but involves the use of a wireless access point to the LAN as opposed to the devices connecting directly to one another.

Figure 2:
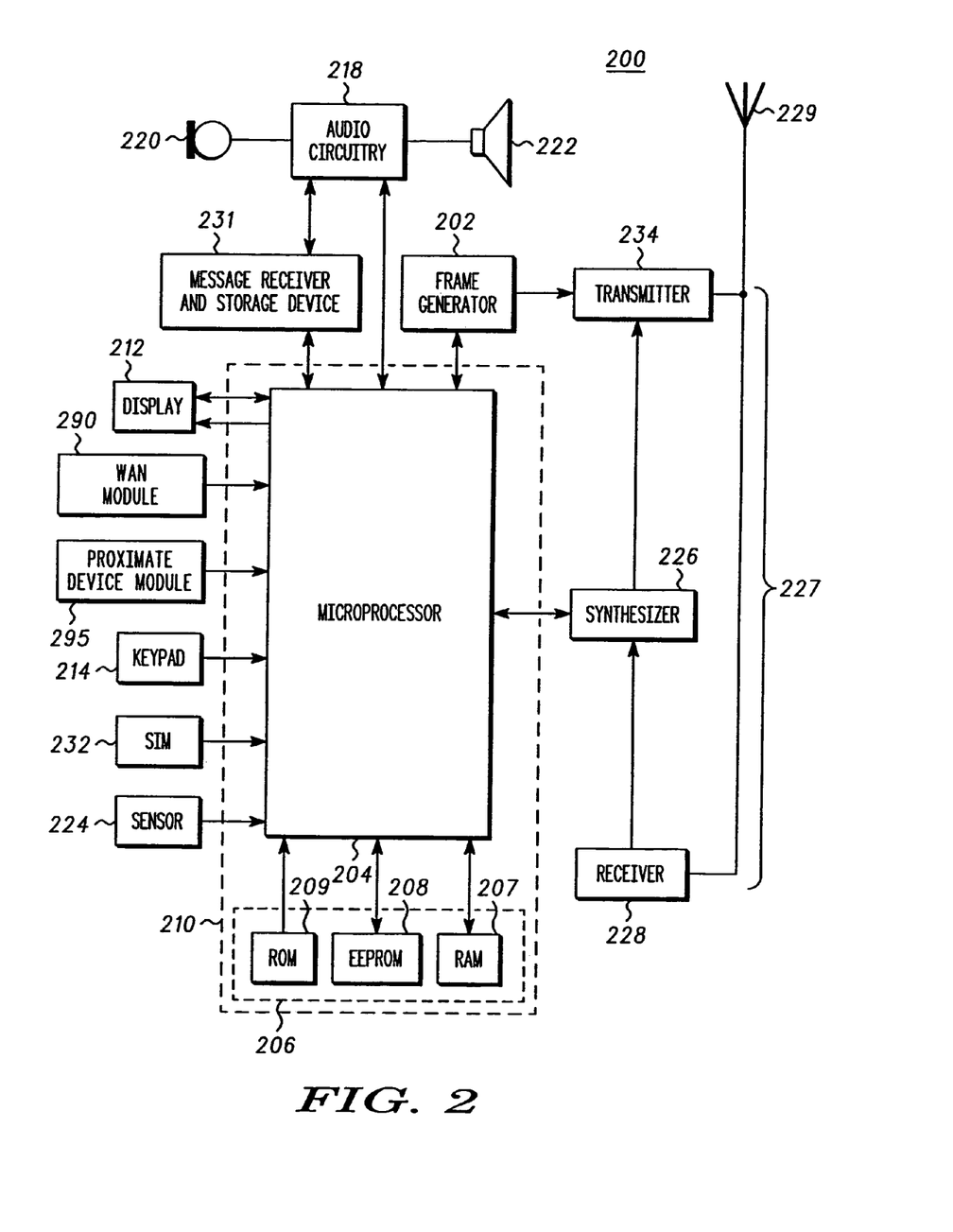
FIG. 2 is an exemplary circuit schematic in block diagram form of a wireless communication device.

Turning to FIG. 2, an exemplary block diagram of a wireless communication device 200 in accordance with the present invention is shown. This exemplary embodiment can be a cellular radiotelephone incorporating the present invention. However, it is to be understood that the present invention is not limited to the exemplary embodiments and may be utilized by other wireless communication devices such as walkie-talkie devices, personal digital assistants, portable computing devices, and the like, having wireless communication capabilities operating through a base station or common node. In the exemplary embodiment, a frame generator Application specific integrated Circuit (ASIC) 202, such as a CMOS ASIC and a microprocessor 204, combine to generate the necessary communication protocol for operating in a cellular system. Microprocessor 204 uses memory 206 comprising RAM 207, EEPROM 208, and ROM 209, preferably consolidated in one package 210, to execute the steps necessary to generate the protocol and to perform other functions for the wireless communication device, such as writing to a display 212, accepting information from a keypad 214, or controlling a frequency synthesizer 226. The memory 206 may also include a SIM card 232. ASIC 202 processes audio transformed by audio circuitry 218 from a microphone 220 and to a speaker 222.

FIG. 2 also shows at least one transceiver 227 comprising receiver circuitry 228 that is capable of receiving RF signals from at least one bandwidth and optionally more bandwidths, if the communications with the proximate device are in a frequency band other than that of the network communications. The receiver 228 may optionally comprise a first receiver and a second receiver, or one receiver capable of receiving in two or more bandwidths. The receiver 228, depending on the mode of operation, may be attuned to receive PLMRS, AMPS, GSM, CDMA, UMTS, WCDMA, Bluetooth, WLAN, such as 802.11 communication signals for example. The transceiver 227 includes at least one transmitter 234. The at least one transmitter 234 may be capable of transmitting to multiple devices potentially on multiple frequency bands. As with the receiver 228, dual transmitters 234 may optionally be employed where one transmitter is for the transmission to a proximate device or direct link establishment to WLAN's and the other transmitter is for transmission to the base station 108.

A wireless communication link can be established between the two proximate devices in accordance with a plurality of methods and or protocols. In one exemplary embodiment, the connection is established directly between the first device 102 and the second device 104, without the aid of an intermediary network node such as a WLAN access point or the base station 108 or the like. In another embodiment, the base station 108 assists the proximate devices in establishing a direct connection therebetween.

Figure 3:
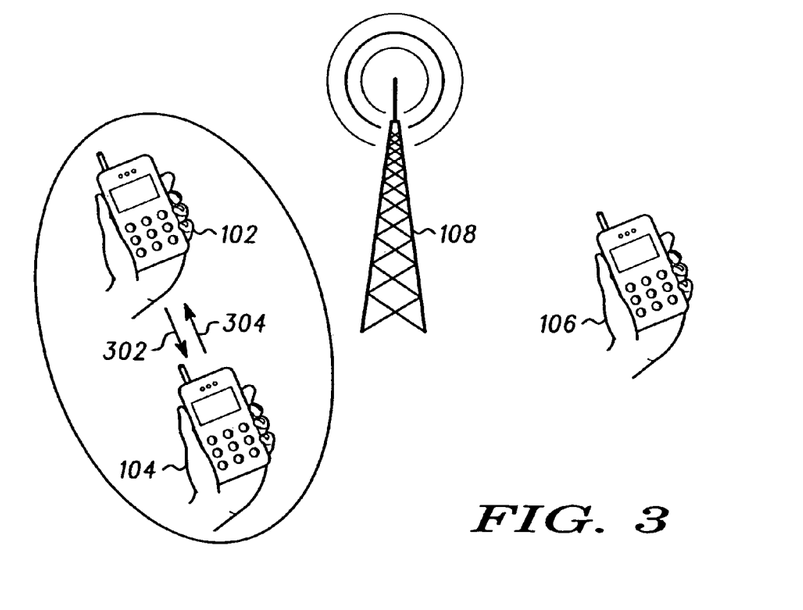
FIG. 3 is an exemplary communication system with a proximate and remote device.
Figure 4:
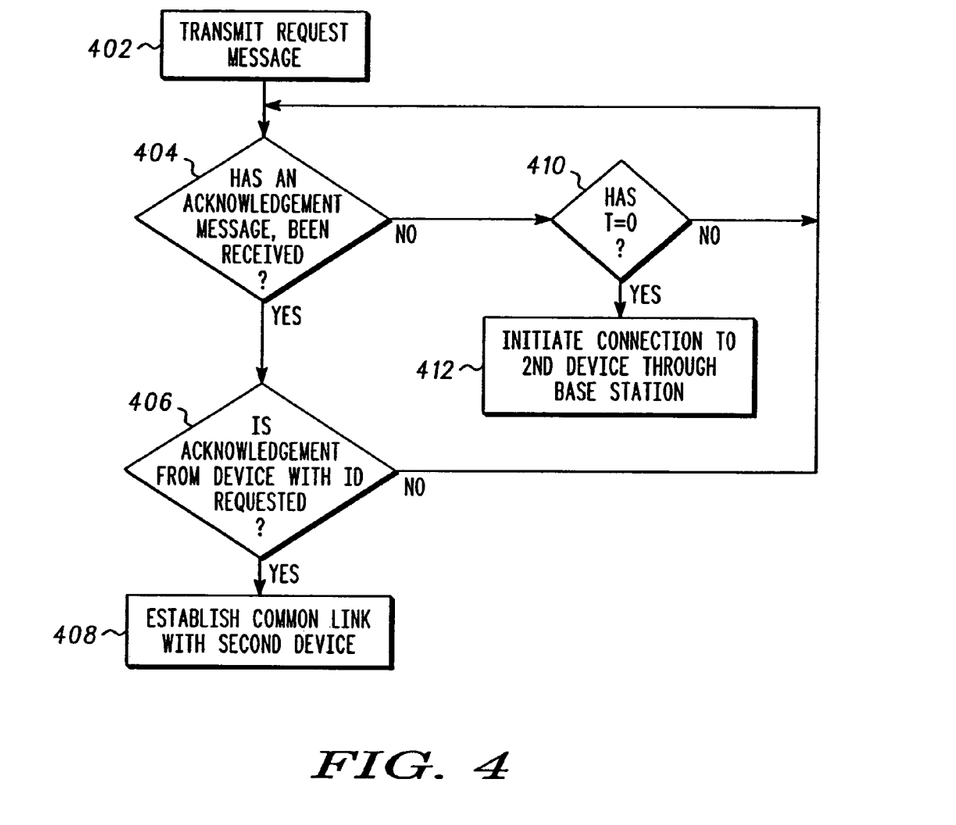
FIG. 4 is an exemplary flow diagram of the present invention.

Moving to FIGS. 3-4, the establishment of a direct connection between the first device 102 and a proximate device 104 directly is illustrated. FIG. 3 illustrates the direct connection between the first device 102 and the second device 104, without base station 108 assistance, while FIG. 4 is an exemplary flow diagram of the same. The transmission 402 of a request message by the first device 102 is illustrated by arrow 302 and the reception of the acknowledgement message 404 by the second device 104 is illustrated by arrow 304 in FIG. 3. In this embodiment, the first device 102 initiates the connection by transmitting the request message 402 to any proximate wireless communication device 104 to identify its presence. The request message 302 in one exemplary embodiment includes an identification of a specific device to which a connection is desired. In another exemplary embodiment, there is no specific identification, but a general request message, requesting any proximate wireless communication device, or devices within transmission range of the first device 102 to acknowledge the request. In the exemplary embodiment illustrated in FIG. 3, the second device 104 is identified in the request message 302 and the intended recipient device 104 in response thereto, transmits an acknowledgement message 304 back to the first device 102. This acknowledgement message 304 is received 404 at the first device 102 and a wireless communication link is established 408 between the proximate wireless communication device 104 or devices and the first device 102. If the request message 302 included the specific device identification, the first device 102 checks the acknowledgement message 304 to determine if the acknowledgment message 304 is from the second device 104 with the matching specific device identification 406. If there is a match, then the second communication path 116 or direct link 117 is established 408 with the proximate wireless communication device 104. If an acknowledgment message 304 is not received at the first device after waiting a predetermined time 410, the first device 102 will attempt to initiate a communication 412 with the proximate wireless communication device 104 through the base station 108.

In one embodiment, the user of the first device 102 selects a group of users desired to receive the communication. In this embodiment, the request message 302 includes a plurality of device identifiers, identifying potential proximate wireless communication devices and in the first step 402 requests the identification of a plurality of proximate wireless communication devices, which are included in the group of users chosen by the user of the first device 102. This may be achieved by transmitting, along with the request 302, all identification numbers associated with each device in the group call that is desired to be communicated with or only those that are known to be proximately located to the first device 102. There are numerous ways to identify a device such as telephone number, electronic serial number (ESN), a mobile identification number (MIN) or the like.

Devices having the capability to transmit and receive directly to and from one another in this embodiment must either constantly monitor a predetermine channel or set of channels or be assigned a channel or set of channels to monitor for other proximate wireless communication devices. In one exemplary embodiment, the request is transmitted over a single predetermined RF channel or a plurality of predetermined RF channels monitored by similar devices. These similar devices may be devices that normally operate on the same network such as a push-to-talk PLMRS network, a CDMA network, a GSM network, WCDMA network or a WLAN for example. Similar devices need only however have the capability to communicate directly with proximate devices as disclosed in the exemplary embodiments. In addition to the direct communication capability the device may also operate as a CDMA device and therefore may communicate over the direct link 117 to a device that also operates as a GSM device.

The ability to communicate directly with devices located in close proximity to one another requires the ability to transmit and receive by each proximate device on the appropriate frequencies. If the devices operate in simplex mode, one channel is used for transmission by both devices and only one device can transmit at a time. Two-way communication in full duplex operation, i.e. simultaneous communication, requires two separate frequencies or logical channels. In analog operation, either of the two operation modes, whether over one channel or two, can be achieved without any channel setup or link establishment as long as the communication channels or frequencies are predetermined. Digital systems however require the establishment of a logical link in order to establish timing and frame sequencing to ensure that the digital communications are received properly. The channels are still predetermined but devices must establish the logical links before communications can occur. Therefore, before a call is placed between the devices, remote or proximate, the logical link must be established. This is the case with push-to-talk systems such as PLMRS.

Devices that are within the direct transmission range of one another may automatically form logical links once they are in range, thereby forming a wireless local area network. This LAN or WLAN can be formed as an ad hoc network or through assignments from the base station. Devices in a LAN which are formed in an ad hoc manner, form the LAN as they move in and out of each other's transmission range. In systems where the base station 108 controls or determines the network of proximate devices 104, the location of each device 102, 104, 106 is known at the base station 108. The base station 108 can then determine which devices are proximate to one another and notify those devices which channels to monitor or transmit on. A distance threshold can be set or predetermined at the base station 108 as to the required distance between the devices necessary to be considered proximate. In addition to the distance between the devices, other parameters or factors may be used such as device type, transmitter type, modulation and multiple access capability and the like to determine when one device is proximate to another. Once the proximate devices have received this information from the base station 108 or have formed the logical link directly with the first device 102, the LAN has been formed through the logical communication links.

Once the proximate devices are logically linked and the wireless LAN connection formed and the proximate devices know the existence of one another, communications can be made directly between the proximate devices, and not through the base station 108. In the exemplary embodiment, a push-to-talk (PTT) mode is used to make the connection between the devices, proximate and remote. One of the proximate devices initiates a push-to-talk call with both the base station 108, or the wide area network (WAN), and simultaneously with the proximate devices via the LAN. Communications proceed with all devices, directly with the proximate device(s) 104 and through the base station 108 for the remote device(s) 106. No matter which of the devices are communicating, any proximate device will receive the communication directly as long as that proximate device 104 is an intended recipient. If a proximate device 104 moves out of range and cannot receive direct communications from the originating or first device 102 currently making the communication, that proximate device 104 becomes a remote device 106. The device changing status from proximate device 104 to the remote device must then receive the communication through the base station 108. It should also be noted that the exemplary embodiment operates in a push-to-talk mode and one skilled in the art will understand that the invention is applicable to any type of communication system with proximate devices.

Figure 5:
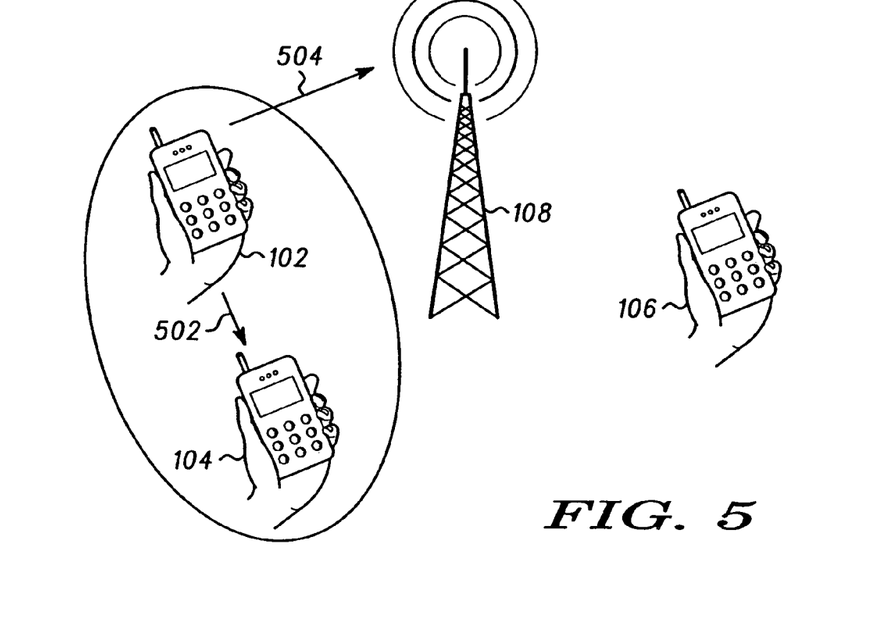
FIG. 5 is an exemplary communication system with a proximate and remote device.
Figure 6:
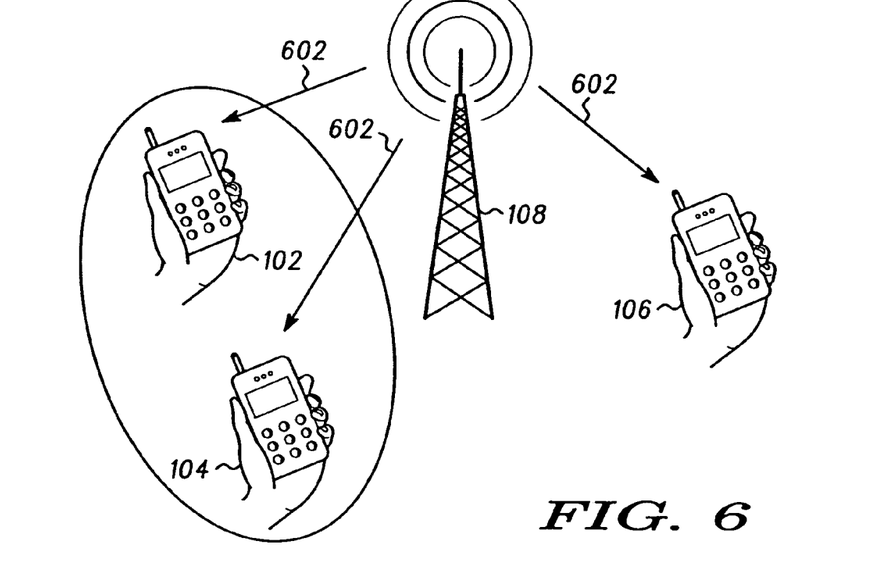
FIG. 6 is an exemplary communication system with a proximate and remote device.
Figure 7:
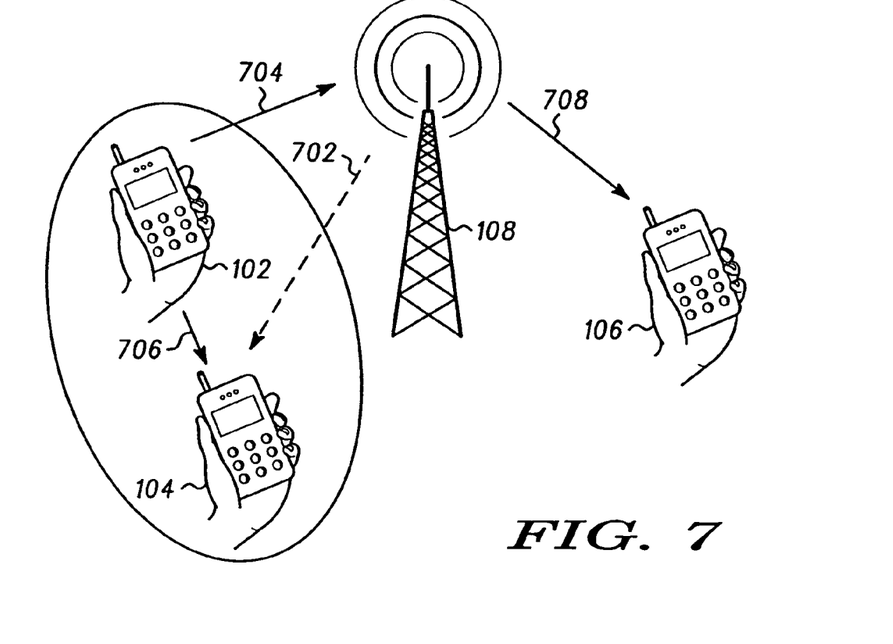
FIG. 7 is an exemplary communication system with a proximate and remote device.

In another exemplary embodiment, as shown in FIGS. 5, 6 and 7 the first device 102, the communication originating device, is logically connected 502 to the proximate devices 104, and the base station 108 and then initiates a PTT call 504. The base station 108 then sends a WAN assignment message 602, as illustrated in FIG. 6 for the PTT call originated by the first device 102 which all devices receive. The originating device 102 resumes its PTT communication with an uplink to the WAN 704 and simultaneously with a direct connection 706 to the proximate devices 104 identified in the WAN assignment message 602 by use of the wireless LAN connection. All proximate devices 104 have the benefit of hearing a reduced delay audio signal, due to the direct connection 706, while all of the non-proximate, remote devices 106 receive the PTT audio signal via the WAN 708 through the base station 108. In this exemplary embodiment, the first device 102, is logically linked to the proximate devices 104 and the base station 108. In this exemplary embodiment, the first device 102 initiates a PTT call to the base station 108 over the WAN and a setup directly with the proximate device 104. The call to the proximate wireless communication device 106 is not set up through the base station 108.

Figure 8:
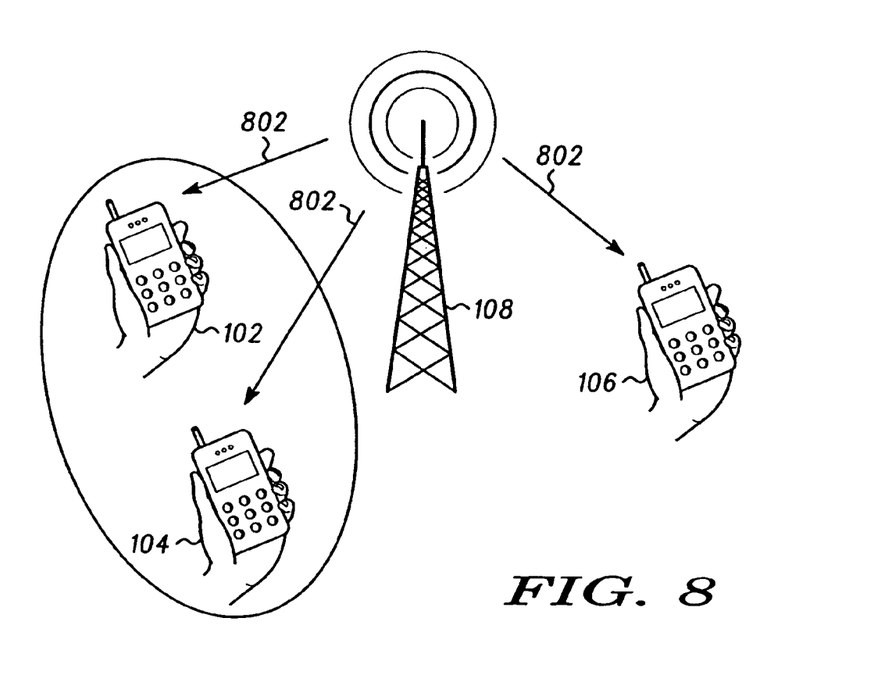
FIG. 8 is an exemplary communication system with a proximate and remote device.
Figure 9:
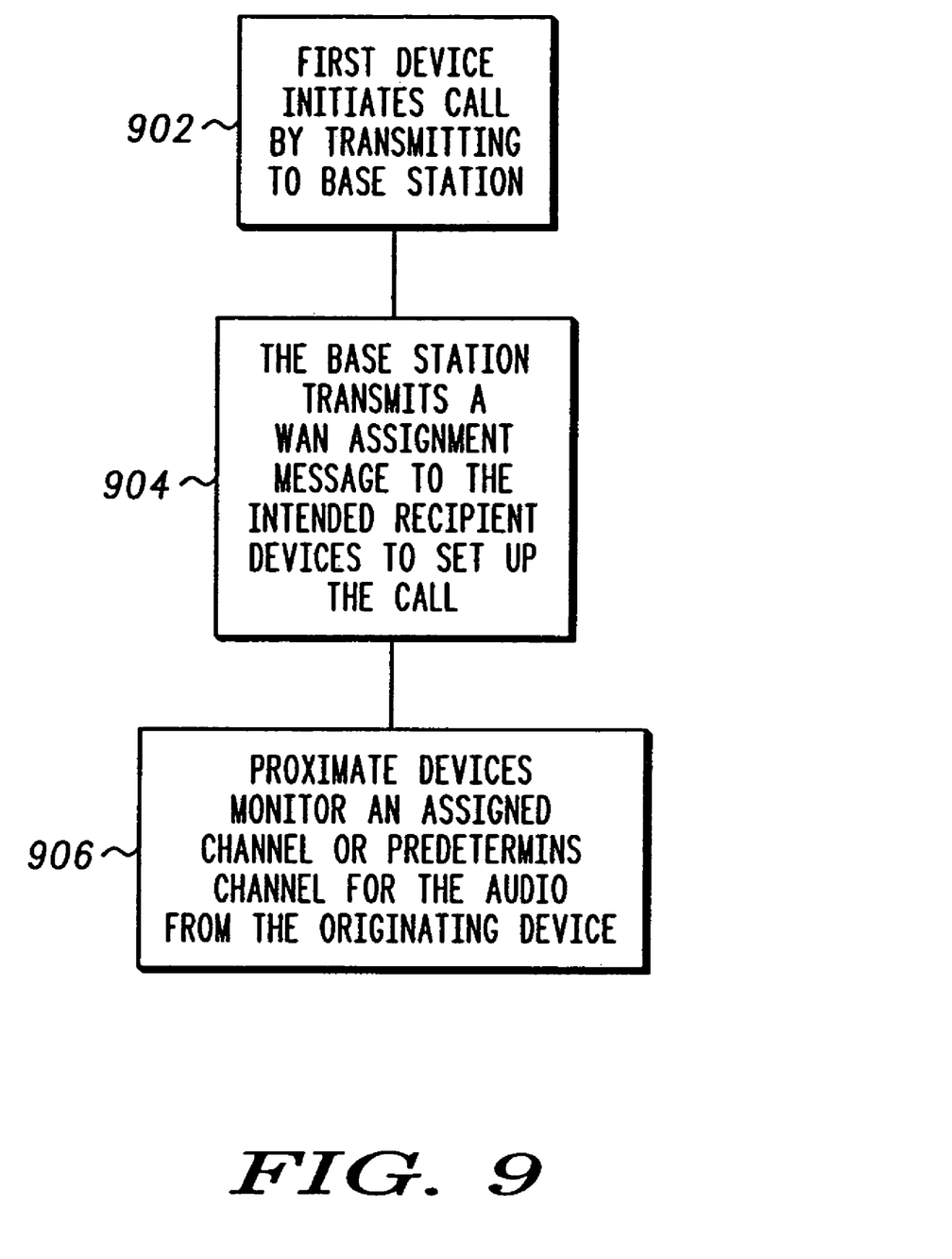
FIG. 9 is an exemplary flow diagram of the present invention.

In FIGS. 8 and 9, another exemplary embodiment and flow diagram show the base station 108 transmitting the WAN assignment message 802 after the first device 102 has established logical communication links with at least one second device 104, i.e. at least one proximate device. In this exemplary embodiment, the first device 102 initiates 902 a PTT call by only transmitting to the base station 108 to set up the call. The base station 108 transmits 904 the WAN assignment message 802 notifying the proximate device 104 that a PTT call has been initiated by the first device 102. The setup of the PTT call is handled by the base station 108 only, with all of the devices, proximate or remote in this exemplary embodiment. Once the PTT call setup is established, the proximate devices 104 can automatically receive the audio from the first device 102, as the logical communication link is already in place. The proximate devices 104 tune 906 to an assigned or predetermined channel to receive the audio from the first device 102. This reduces the current drain as there is no need for the proximate device 104 to continuously monitor for a direct point to point PTT call setup from the first device 102 and the a PTT call setup from the base station 108. The proximate device 104 need only monitor the for a direct point to point PTT call setup.

Figure 10:
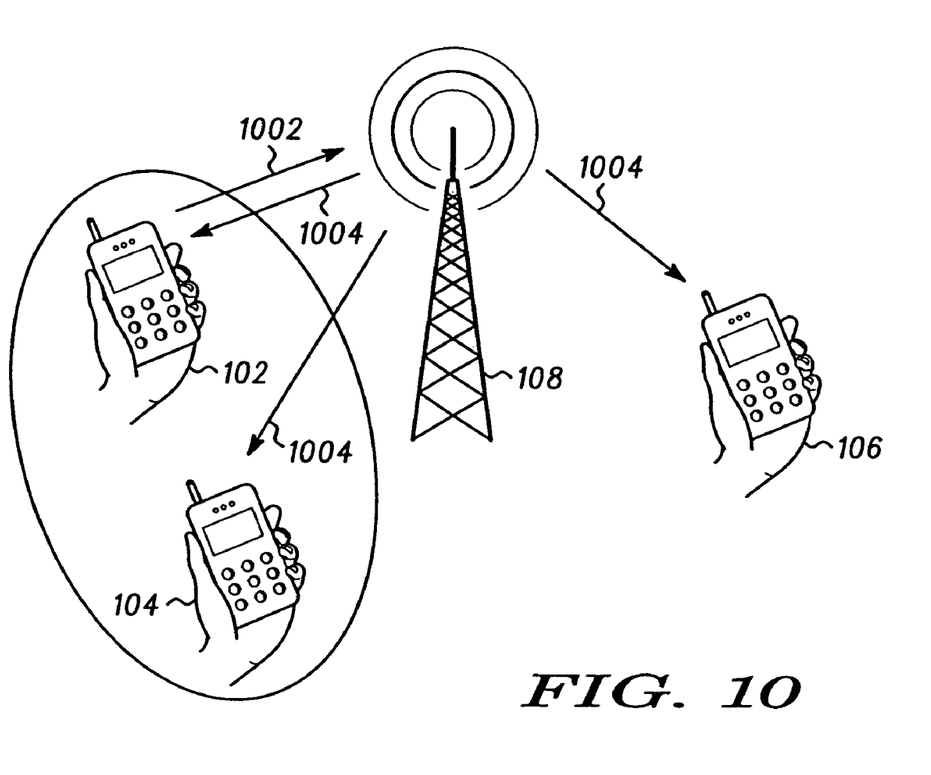
FIG. 10 is an exemplary communication system with a proximate and remote device.
Figure 11:
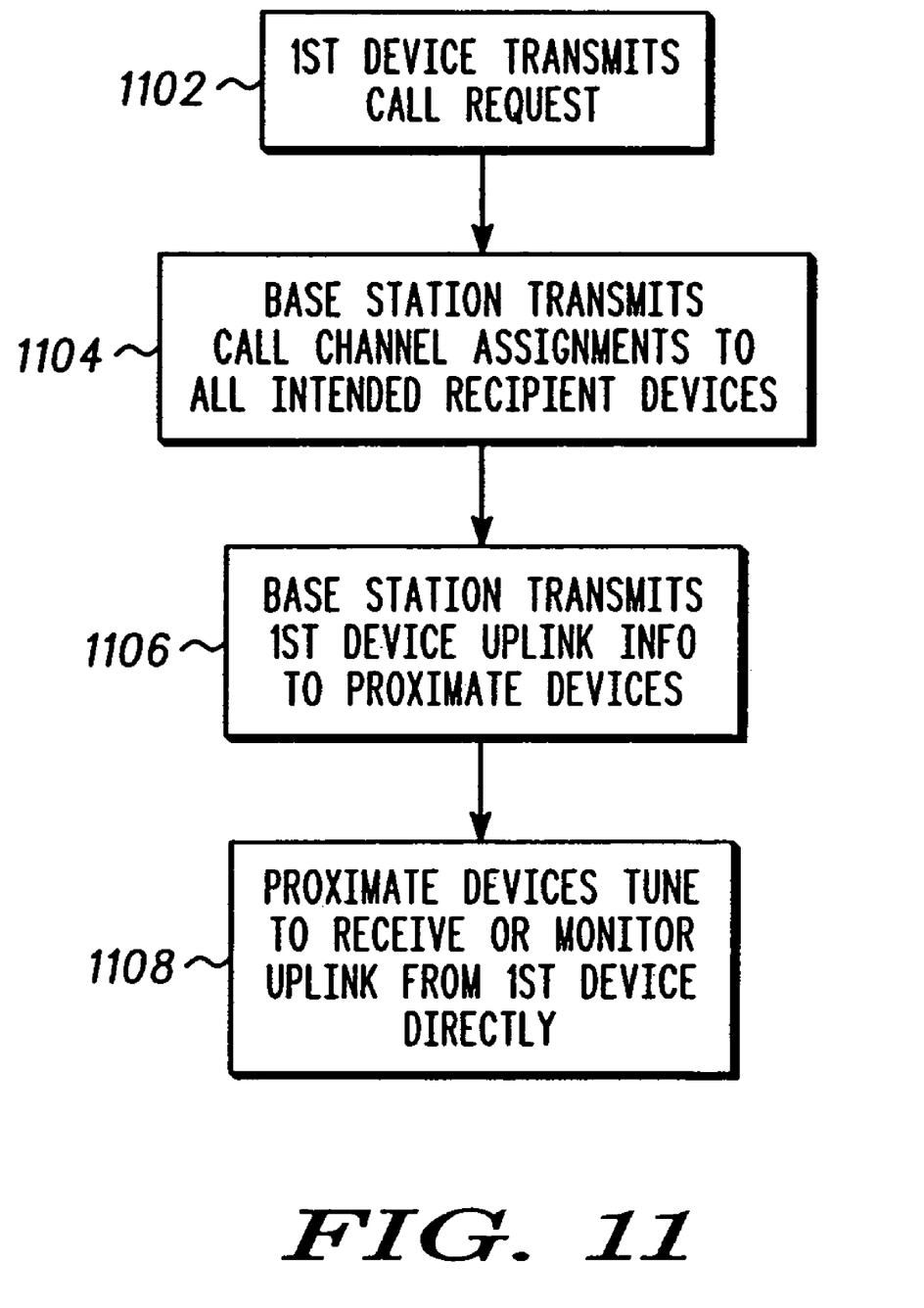
FIG. 11 is an exemplary flow diagram of the present invention.

Moving to FIGS. 10 and 11, another embodiment and flow diagram is shown wherein a wireless local area network is not used in establishing the logical communication link directly between the first device 102 and the at least one proximate device 104. In this embodiment, the first device 102, which can be a proximate device 104, initiates 1102 a call by transmitting a call request 1002 to the base station 108 over the WAN. In response to the call initiation, the base station 108 sends 1104 the call channel assignments to all the devices with the WAN assignment message 1004. Included in the WAN assignment message 1004, in this embodiment, is the uplink information of the first device 102 which is thereby transmitted 1106 to the proximate devices 104. The uplink information has the channel or frequency information that allows the proximate devices 104 to monitor or receive 1108 the audio communication of the first device 102 when it is transmitting. The proximate device(s) 104 therefore receive 1108 the audio communication directly from the first device 102 and the remote devices 106 continue to receive the audio communication via the base station 108 using a single transmitter. In this embodiment, the proximate device(s) 104 may intermittently check to see if they can decode the valid uplink WAN signals from the first device 102 if they are not already decoding the uplink information. The proximate device(s) 104 will have this information already from the WAN assignment message and they are paired with the channel assignment made for the WAN downlink. If the proximate device(s) 104 detect the valid WAN uplink signals, they must be coming from a proximate subscriber device as the channel and synchronization information has already been received. Uplink WAN signals will only be able to be received by devices that are very close to the transmitting subscriber device.

It is apparent that the least amount of latency would be likely obtained with the audio sent in parallel via the WLAN channel. However, a significant reduction in audio delay would also be possible by the proximate user receiving the originator's uplink WAN signal directly. It should also be noted that in any of the embodiments that the downlink channel from the base station 108 may still always available to the proximate device 104, should the direct connection be lost due to movement or obstruction. As the proximate device 104 moves and becomes remote, i.e. non-proximate, the proximate device 104 then will be become a remote device 106 and in order to maintain communications will necessarily need to continue the reception from the base station 108.

In the present invention, the direct link 117 establishment between the proximate devices 104 may be accomplished in an ad hoc fashion. In one exemplary embodiment, neither the first device 102 nor the proximate device 104 is an established master or slave; a hierarchal relationship between networked devices which is generally required to establish the communication link or local area network. However, in the present invention, both devices operate autonomously and independently, and therefore an ad hoc process must determine who plays the role of the "master" device, thereby controlling communications between the devices and maintaining the logical link therebetween. A "master" will control the flow of information between the two devices following a predetermined protocol to allow for efficient and common command execution. This is generally called a master-slave relationship and is common in networking protocols. In the present case, the close proximate relationship, selection of the intended recipients address at the first device 102 and subsequent activation of the first devices 102 push-to-talk switch, may initiate the link establishment sequence. Or, if the link is established before a call is initiated and only when the devices become proximately related, one device must be established as the master. In either case, this link can be achieved by point-to-point transmissions from the first device 102 to a proximate device 104 for example, or over a local area network as discussed above. Point-to-point or direct communication however will achieve the least amount of audio latency.

In one embodiment, an ad hoc network is formed as a result of the close proximity of the two devices. In this embodiment, proximate devices establish a connection automatically without any action by the user of either device. Although this method applies to the establishment of a network among a plurality of devices, the connection of two devices is used for illustrative purposes. In this exemplary embodiment both devices, the first device 102 and a proximate device 104, transmit at random or pseudorandom times and intervals, discovery messages on a predetermined frequency or set of frequencies. Each discovery message is an "are you there" message, which is an inquiry or request message to the other device, or devices, for an acknowledgment. When the respective device is not sending a request message, that device is listening (i.e. the receiver is monitoring a frequency or set of frequencies for identifiable messages) for a request message from the other device. Because each device is transmitting the request message at random times and listening in-between transmissions, at some point in time, one device will be in receive mode and the other in transmit mode, and the receiver will hear the request message. Receiving the request message will trigger a response by the receiving device. The receiving device will transmit an acknowledgement to the first or requesting device. In this embodiment, the requesting device takes on the role of the master and controls the logical communication link from that point on.

Figure 12:
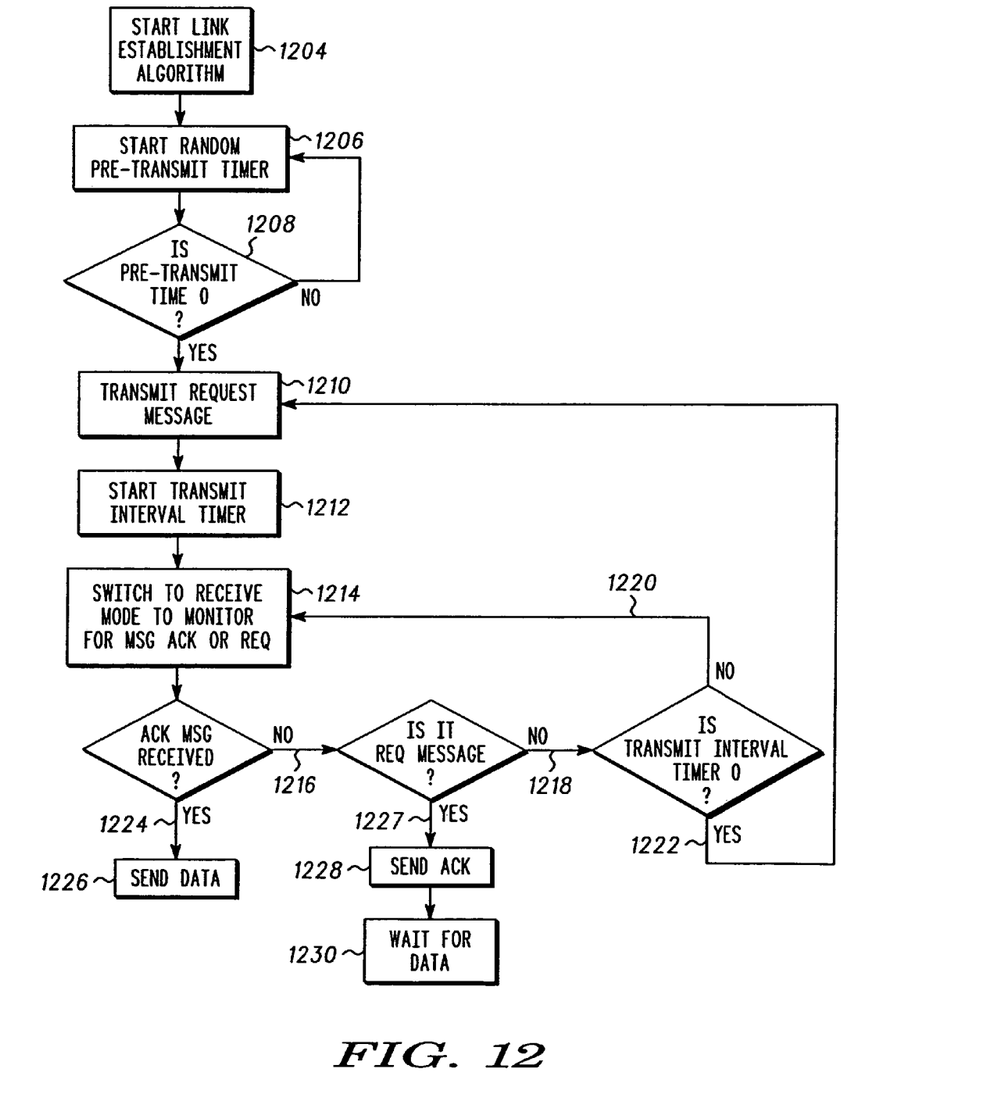
FIG. 12 is an exemplary flow diagram of ad hoc network formation.

This embodiment is illustrated in the exemplary flow chart in FIG. 12. First, the call is initiated or the first device 102 is looking to discover proximate devices 104. Each device begins a link establishment algorithm 1204 and starts 1206 the random pre-transmit timer. The algorithm 1204 may wait a random pre-transmit time and, when the pre-transmit timer reaches zero 1208, transmit a first request message 1210. The random pre-transmit time 1206 will cause the transmission of a request message by each device to be staggered. As soon as the first device 102 transmits the request message 1210, a second random timer begins 1212. At the same time, the first device 102 goes into receive mode 1214 to monitor for a request message or acknowledgement message from the second device 104. If the first device 102 has not received an acknowledgement message 1216 nor a request message 1218, and the transmit interval timer has not reached zero 1220, then the first device 102 continues to monitor for a message. If the random transmit interval timer reaches zero 1222, before an acknowledgment or request message has been received, then the first device 102 will transmit another or second request message 1210. If the first device 102 does receive an acknowledgment 1224, a link between the two devices has been established and data can be sent 1226. If a request message has been received instead 1227, the first device 102 will transmit an acknowledge message 1228 and then wait for more data 1230 from the second device 104. This is just one embodiment and as one of ordinary skill in the art will recognize, there are other effective methods of establishing a communication in an ad hoc fashion for the purposes of the present invention.

There are multiple methods of forming ad hoc and or mesh networks known to those of ordinary skill in the art. These include, for example, several draft proposals for ad hoc network protocols including: The Zone Routing Protocol (ZRP) for Ad Hoc Networks, Ad Hoc On Demand Distance Vector (AODV) Routing, The Dynamic Source Routing Protocol for Mobile Ad Hoc Networks, Topology Broadcast based on Reverse-Path Forwarding (TBRPF), Landmark Routing Protocol (LANMAR) for Large Scale Ad Hoc Networks, Fisheye State Routing Protocol (FSR) for Ad Hoc Networks, The Interzone Routing Protocol (IERP) for Ad Hoc Networks, The Intrazone Routing Protocol (IARP) for Ad Hoc Networks, or The Bordercast Resolution Protocol (BRP) for Ad Hoc Networks.

In one exemplary embodiment, referring back to FIG. 2, the wireless communication device 200 includes a controller or microprocessor 204, a transmitter 234 coupled to the microprocessor 204. The transmitter 234 is capable of transmitting a first communication on a first link 112 and a second communication on a second link 116 simultaneously. The wireless communication device 200 further includes a wide area network communication module 290 coupled to the microprocessor 204 and a proximate device communication module 295 coupled to the microprocessor 204. The wide area network communication module 290 is configured to communication to the base station 108, which is part of a wide area network. In one exemplary embodiment the base station 108 is in a dispatch communication system. In another exemplary embodiment, the base station 108 is part of a cellular communication system. In general, a base station 108 is a device used to relay messages over greater distances than is possible with point-to-point communications. The proximate device communication module 295, coupled to the microprocessor, is configured to communicate a first communication on first link to a proximate to a proximate wireless communication device 104 simultaneously with the wide area network communication module 290 communicating with the base station 108. The wide area network communication module communicates, simultaneously with communicating the first communication, a second communication on a second link to the base station, wherein the first communication and the second communication are substantially the same. The proximate device communication module 295 is configured to communicate over a local area network of proximate wireless communication devices. In one embodiment the proximate device communication module communicates with a proximate wireless communication device 104 using an ad hoc networking protocol which may be one of the protocols discussed above or the like. The wide area network communication module 290 and the proximate device communication module 295 may reside in the microprocessor 204 as independent hardware or modules, in memory 206 or anywhere else in the wireless communication device 200.

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A method in a wireless handheld communication device for reducing a communication delay at a proximate wireless communication device comprising:

communicating a first communication on first link to a proximate wireless communication device; and communicating simultaneously with communicating said first communication, a second communication on a second link, wherein said first communication and said second communication are substantially the same, and wherein communicating said second communication further comprises communicating said second communication to a remote device by relaying said second communication through a base station to said remote device, and wherein a first communication delay associated with said first communication to said proximate wireless communication device is less than a second communication delay associated with said second communication to said remote device relayed through said base station.

* * * * *